(12) United States Patent
Henning et al.

(10) Patent No.: US 8,623,984 B2
(45) Date of Patent: Jan. 7, 2014

(54) COMPOSITIONS CONTAINING POLYETHER-POLYSILOXANE COPOLYMERS

(75) Inventors: Frauke Henning, Essen (DE); Carsten Schiller, Mulheim an der Ruhr (DE); Horst Dudzik, Essen (DE); Eva Emmrich, Essen (DE); Annegret Terheiden, Duisburg (DE); Martin Glos, Borken (DE); Wilfried Knott, Essen (DE); Christian Eilbracht, Herne (DE)

(73) Assignee: Evonik Goldschmidt GmbH, Essen (DE)

( * ) Notice: Subject to any disclaimer, the term of this patent is extended or adjusted under 35 U.S.C. 154(b) by 493 days.

(21) Appl. No.: 12/784,077

(22) Filed: May 20, 2010

(65) Prior Publication Data

US 2010/0298455 A1    Nov. 25, 2010

(30) Foreign Application Priority Data

May 20, 2009  (DE) .................. 10 2009 003 274

(51) Int. Cl.
| | |
|---|---|
| C08G 18/48 | (2006.01) |
| C08G 77/46 | (2006.01) |
| C08G 18/00 | (2006.01) |
| C08G 77/06 | (2006.01) |
| C08G 77/12 | (2006.01) |
| C08G 77/04 | (2006.01) |
| C08J 9/00 | (2006.01) |
| C08F 283/00 | (2006.01) |
| C08F 283/12 | (2006.01) |
| C08G 77/00 | (2006.01) |
| C08G 77/38 | (2006.01) |
| C08L 83/00 | (2006.01) |
| C07F 7/04 | (2006.01) |
| C07F 7/08 | (2006.01) |

(52) U.S. Cl.
USPC ............. 528/12; 521/110; 521/112; 521/155; 521/170; 525/479; 528/10; 528/23; 528/31; 528/34; 556/478; 556/479

(58) Field of Classification Search
USPC .............. 528/31, 34, 37, 10, 12, 23; 556/479; 521/110, 112, 155, 170; 525/479
See application file for complete search history.

(56) References Cited

U.S. PATENT DOCUMENTS

| | | | | |
|---|---|---|---|---|
| 3,541,127 A * | 11/1970 | Beattie et al. | ............. | 556/446 |
| 3,796,676 A | 3/1974 | Kanner et al. | | |
| 5,321,051 A * | 6/1994 | Burkhart et al. | ............. | 521/112 |
| 5,430,166 A | 7/1995 | Klein et al. | | |
| 5,455,367 A | 10/1995 | Klein et al. | | |
| 5,475,127 A | 12/1995 | Klein et al. | | |
| 5,981,812 A | 11/1999 | Eufinger et al. | | |
| 6,291,622 B1 | 9/2001 | Drose et al. | | |
| 6,307,082 B1 | 10/2001 | Klein et al. | | |
| 6,858,663 B2 * | 2/2005 | Knott et al. | ............. | 524/266 |
| 6,942,716 B2 | 9/2005 | Knott et al. | | |
| 7,018,458 B2 | 3/2006 | Knott et al. | | |
| 7,125,585 B2 | 10/2006 | Dudzik et al. | | |
| 7,157,541 B2 | 1/2007 | Knott et al. | | |
| 7,196,153 B2 | 3/2007 | Burkhart et al. | | |
| 7,598,334 B2 | 10/2009 | Ferenz et al. | | |
| 7,612,158 B2 | 11/2009 | Burkhart et al. | | |
| 7,612,159 B2 | 11/2009 | Burkhart et al. | | |
| 7,619,035 B2 | 11/2009 | Henning et al. | | |
| 7,671,103 B2 | 3/2010 | Eilbracht et al. | | |
| 8,138,294 B2 * | 3/2012 | Henning et al. | ............. | 528/12 |
| 8,420,748 B2 * | 4/2013 | Henning et al. | ............. | 525/479 |
| 2007/0021581 A1 | 1/2007 | Eilbracht et al. | | |
| 2007/0049717 A1 | 3/2007 | Knott et al. | | |
| 2007/0093565 A1 | 4/2007 | Glos et al. | | |
| 2007/0128143 A1 | 6/2007 | Gruning et al. | | |
| 2008/0076842 A1 | 3/2008 | Ferenz et al. | | |
| 2008/0125503 A1 | 5/2008 | Henning et al. | | |
| 2008/0146688 A1 | 6/2008 | Glos et al. | | |
| 2008/0153934 A1 | 6/2008 | Neumann et al. | | |
| 2008/0153992 A1 | 6/2008 | Knott et al. | | |
| 2008/0153995 A1 | 6/2008 | Knott et al. | | |
| 2009/0030097 A1 | 1/2009 | Knott et al. | | |
| 2009/0043001 A1 | 2/2009 | Bruckner et al. | | |
| 2009/0088488 A1 | 4/2009 | Bruckner et al. | | |
| 2009/0088489 A1 | 4/2009 | Terheiden et al. | | |
| 2009/0137751 A1 | 5/2009 | Knott et al. | | |
| 2009/0137752 A1 | 5/2009 | Knott et al. | | |
| 2010/0022435 A1 | 1/2010 | Henning et al. | | |
| 2010/0029587 A1 | 2/2010 | Bruckner et al. | | |
| 2010/0036011 A1 | 2/2010 | de Gans et al. | | |
| 2010/0041910 A1 | 2/2010 | Schubert et al. | | |
| 2010/0056649 A1 | 3/2010 | Henning et al. | | |
| 2010/0105843 A1 * | 4/2010 | Knott et al. | ............. | 525/474 |
| 2010/0113633 A1 * | 5/2010 | Henning et al. | ............. | 521/112 |
| 2010/0249339 A1 * | 9/2010 | Henning et al. | ............. | 525/479 |

(Continued)

OTHER PUBLICATIONS

European Search Report dated Nov. 15, 2010.

*Primary Examiner* — Melissa Rioja

(74) *Attorney, Agent, or Firm* — Scully, Scott, Murphy & Presser, P.C.

(57) ABSTRACT

The present invention relates to compositions containing polyether-siloxane copolymers which are based on branched SiH-functional siloxanes, where at least one of the polyether-siloxane copolymers has a radical —OR8 where R8=hydrogen or an alkyl radical having from 1 to 10 carbon atoms which is bound to a silicon atom, a process for producing polyurethane foam in which these compositions are used as foam stabilizers, polyurethane foams containing these compositions and the use of these polyurethane foams.

17 Claims, No Drawings

(56) References Cited

U.S. PATENT DOCUMENTS

| | | | |
|---|---|---|---|
| 2011/0034576 A1* | 2/2011 | Henning et al. | 521/137 |
| 2011/0245412 A1* | 10/2011 | Schubert et al. | 524/588 |
| 2011/0257280 A1* | 10/2011 | Glos et al. | 521/54 |
| 2011/0306694 A1* | 12/2011 | Glos et al. | 521/112 |
| 2012/0027704 A1* | 2/2012 | Henning et al. | 424/59 |
| 2012/0046486 A1* | 2/2012 | Henning et al. | 556/451 |
| 2012/0088856 A1* | 4/2012 | Glos et al. | 521/112 |
| 2013/0035407 A1* | 2/2013 | Lobert et al. | 521/112 |

* cited by examiner

COMPOSITIONS CONTAINING POLYETHER-POLYSILOXANE COPOLYMERS

FIELD OF THE INVENTION

The present invention relates to compositions containing polyether-siloxane copolymers which are based on branched SiH-functional siloxanes, where at least one of the polyether-siloxane copolymers has a radical —OR8 where R8 is an alkyl radical having from 1 to 10 carbon atoms which is bound to a silicon atom. The present invention further relates to a process for producing polyurethane foam in which the aforementioned compositions are used as foam stabilizers, polyurethane foams containing these compositions and the use of these polyurethane foams.

BACKGROUND OF THE INVENTION

In the production of polyurethane foams, use is frequently made of polyether-polysiloxane copolymers which can be divided into two classes of stabilizers. Polyether-polysiloxane copolymers in which the polyethers are linked via an SiOC bond to the polysiloxane chain have been known for a long time. Such copolymers are prepared by reacting hydroxyl-functional polyethers either with chlorosiloxanes in a substitution reaction or with alkoxysiloxanes in a transesterification reaction. This product group advantageously displays a wide processing latitude and a high activity, i.e., polyurethane foams which have a fine cell structure, the desired proportion of open/closed cells and are free of foam defects are obtained in a wide concentration range of the stabilizer. Owing to these properties, polyurethane (PU) stabilizers of the SiOC product group can be widely used in many formulations. A disadvantage is the limited hydrolysis stability of the SiOC bond which leads to the stabilizers and in particular their blends or formulations not being able to be stored for a long time. A further disadvantage of the SiOC stabilizers is their moderate solubility in polyol formulations, which can lead to turbidity or even to separation phenomena of the fully formulated polyol formulation. This problem occurs particularly in the case of rigid foam applications in which solubility and separation stability of preformulated mixtures of polyols, catalysts, water/blowing agents, the foam stabilizer and optionally further additives, which are marketed as ready-to-use polyurethane foam systems, are frequently required.

To counter the unsatisfactory storage stability, a second class of polyether-polysiloxane copolymers in which the polyethers are bound via hydrolysis-stable SiC bonds to the polysiloxane has been developed. These copolymers are prepared by noble metal-catalysed hydrosilylation of allyl polyethers by means of hydrogensiloxanes. PU stabilizers of the SiC product group display, in addition to their very good storage stability, a high solubility in polyol formulations. However, when used in high-resilience flexible foam applications, the broad processing latitude known for SiOC stabilizers is not obtained since the amount of stabilizer used has to be kept constant within a narrow range in order to achieve consistently good foam properties.

SUMMARY OF THE INVENTION

The present invention provides a foam stabilizer which combines the advantages of the SiOC foam stabilizers and the SiC foam stabilizers in one product without suffering from the disadvantages of the two classes of products described above. In particular, the present invention provides a polyurethane foam stabilizer which preferably has a high activity with a wide processing latitude and a high ageing resistance.

In one embodiment, the present invention provides a composition which can be used as a foam stabilizer which includes at least one compound of formula (I)

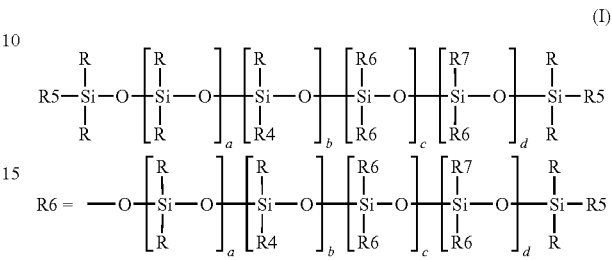

where
the indices a are each, independently of one another, from 0 to 500,
the indices b are each, independently of one another, from 0 to 60,
the indices c are each, independently of one another, from 0 to 10,
the indices d are each, independently of one another, from 0 to 10,
with the proviso that $\Sigma c + \Sigma d \geq 1$ per molecule of the formula (I) and that the average number $\Sigma d$ of the T units and the average number $\Sigma c$ of the Q units per molecule are in each case not greater than 50, the average number $\Sigma a$ of the D units per molecule is not greater than 2000 and the average number $\Sigma b$ of the siloxy units bearing R4 per molecule is not greater than 100,
the radicals R are each at least one radical from the group consisting of linear, cyclic or branched, aliphatic or aromatic, saturated or unsaturated hydrocarbon radicals having from 1 to 20 carbon atoms,
the radicals R5 are each, independently of one another, R4, —OR8 or R,
the radicals R4 are each, independently of one another, —OR8 or an organic radical which is not R,
the radicals R7 can each be R, R4, —OR8 and/or a heteroatom-substituted, functional, organic, saturated or unsaturated radical selected from the group consisting of alkyl, chloroalkyl, chloroaryl, fluoroalkyl, cyanoalkyl, acryloxyaryl, acryloxyalkyl, methacryloxyalkyl, methacryloxypropyl and vinyl radicals,
the radicals R8 are each, independently of one another, hydrogen or an alkyl radical having from 1 to 10 carbon atoms,
with the proviso that at least one substituent from among R4, R5 and R7 is not R and at least one compound of the formula (I) in which at least one of the radicals R4, R5 and R7 is a radical —OR8 is present and, averaged over all compounds of the formula (I) present in the composition, not more than 20 mol % of the radicals R4, R5 and R7 are —OR8.

Applicants have surprisingly found that when compositions containing a poly(alkoxy organosilicate) of formula I are used as a foam stabilizer, they exhibit the advantages of the SiOC foam stabilizers and the SiC foam stabilizers in one product without suffering from the disadvantages of the two classes of products. This is surprising and unforeseeable to a person skilled in the art since alkoxyl ester functions on an organomodified polysiloxane usually give a variable performance of the additive due to hydrolytic degradation, which restricts the storage stability.

The present invention also provides polyurethane foams and a process for producing polyurethane foams which comprise the composition of the invention or in which the composition of the invention is used. In addition, the present invention provides for the use of the polyurethane foams of the invention or produced according to the invention.

The composition of the invention has the advantage that it is storage-stable and its foam-stabilizing properties are maintained even in admixture with preformulated polyol systems including water and catalysts over a long period of time. Furthermore, the composition of the invention displays a high activity as foam stabilizer combined with a wide processing latitude and good solubility in polyurethane systems.

The process of the invention has the advantage that preformulated mixtures of polyols, catalysts, water/blowing agents, the foam stabilizer and optionally further additives, which are marketed as ready-to-use polyurethane foam systems, survive the storage times customary on the market without impairment of the foam properties. When SiOC stabilizers, on the other hand, are used, storage stability is not ensured due to hydrolytic degradation of the foam stabilizer. A further advantage of the invention is that inaccuracies in the metering of the stabilizer generally do not result, owing to the wide processing latitude, in impairment of the foam properties, which would have to be feared in the case of classical SiC stabilizers.

The polyurethane foam of the invention has the advantage that it has a consistently high quality, i.e., a particularly fine cell structure with few foam defects (voids, cracks, densified regions).

DETAILED DESCRIPTION OF THE INVENTION

The compositions of the invention, the process for producing the polyurethane foams, the polyurethane foams themselves and their uses will be described by way of example below without the invention being restricted to these illustrative embodiments. If ranges, general formulae or classes of compound are indicated below, these do not encompass only the corresponding ranges or groups of compounds which are explicitly mentioned but also all subranges and subgroups of compounds which can be obtained by leaving out individual values (ranges) or compounds. If documents are cited in the present description, their contents are fully incorporated by reference into the disclosure content of the present invention.

As stated above, the compositions of the invention are characterized in that they contain compounds of formula (I)

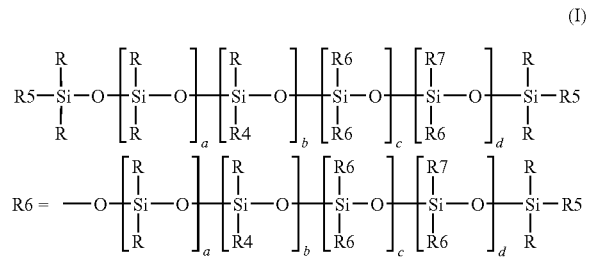

(I)

where
the indices a are each, independently of one another, from 0 to 500,
the indices b are each, independently of one another, from 0 to 60,
the indices c are, independently of one another, from 0 to 10, preferably from 0 or >0 to 5,
the indices d are each, independently of one another, from 0 to 10, preferably from 0 or >0 to 5,
with the proviso that $\Sigma c + \Sigma d >= 1$ per molecule of formula (I) and that the average number $\Sigma d$ of the T units and the average number $\Sigma c$ of the Q units per molecule are in each case not greater than 50, the average number $\Sigma a$ of the D units per molecule is not greater than 2000 and the average number $\Sigma b$ of the siloxy units bearing R4 per molecule is not greater than 100,
the radicals R are each, independently of one another, at least one radical from the group consisting of linear, cyclic or branched, aliphatic or aromatic, saturated or unsaturated hydrocarbon radicals having from 1 to 20 carbon atoms, but R is preferably a methyl radical, the radicals R5 are each, independently of one another, R4, —OR8 or R,
the radicals R4 are each, independently of one another, —OR8 or an organic radical other than R, preferably
—OR8
—CH$_2$—CH$_2$—CH$_2$—O—(CH$_2$—CH$_2$O—)$_x$—(CH$_2$—CH(R')O—)$_y$—R"
—CH$_2$—CH$_2$—O—(CH$_2$—CH$_2$O—)$_x$—(CH$_2$—CH(R')O—)$_y$—R"
—CH$_2$—R$^{IV}$
—CH$_2$—CH$_2$—(O)$_{x'}$—R$^{IV}$
—CH$_2$—CH$_2$—CH$_2$—O—CH$_2$—CH(OH)—CH$_2$OH

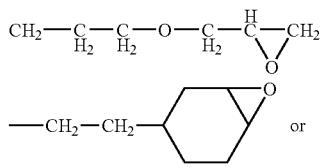

or

—CH$_2$—CH$_2$—CH$_2$—O—CH$_2$—C(CH$_2$OH)$_2$—CH$_3$, where
x is from 0 to 100, preferably>0, in particular from 1 to 50,
x' is 0 or 1,
y is from 0 to 100, preferably>0, in particular from 1 to 50,
the radicals R' are each, independently of one another, an optionally substituted, for example alkyl-, aryl- or haloalkyl- or haloaryl-substituted, alkyl or aryl group having from 1 to 12 carbon atoms, where different substituents R' can be present within a radical R4 and/or a molecule of formula I, and
the radicals R" are each, independently of one another, a hydrogen radical or an alkyl group having from 1 to 4 carbon atoms, a group —C(O)—R''' where R'''=alkyl radical, a group —CH$_2$—O—R', an alkylaryl group such as a benzyl group, the group —C(O)NH—R',
R$^{IV}$ is a linear, cyclic or branched, optionally substituted, e.g. halogen-substituted, hydrocarbon radical having from 1 to 50, preferably from 9 to 45, more preferably from 13 to 37, carbon atoms,
the radicals R7 can each be, independently of one another, R, R4, —OR8 and/or a heteroatom-substituted, functional, organic, saturated or unsaturated radical selected from the group consisting of alkyl, aryl, chloroalkyl, chloroaryl, fluoroalkyl, cyanoalkyl, acryloxyaryl, acryloxyalkyl, methacryloxyalkyl, methacryloxypropyl and vinyl radicals, the radicals R8 are each, independently of one another, a hydrogen radical or an alkyl radical having from 1 to 10 carbon atoms, preferably a methyl, ethyl or isopropyl radical, with the proviso that at least one substituent from among R4, R5 and R7 is not R and at least one compound of the formula (I) in which at least one of the radicals R4, R5 and R7 is a radical —OR8 is present and, averaged over all compounds of the formula (I) present in the composition, not more than 20 mol % of the radicals R4, R5 and R7 are —OR8.

Preference is given to from 0.1 to 10 mol % of the radicals R4, R5 and R7, averaged over all compounds of formula (I) present in the composition, being of the type —OR8. The molar fraction of alkoxyl radicals —OR8 is defined according to formula (I) as the molar fraction of the radicals —OR8 in the sum of the radicals R4, R5 and R7.

Preference is given to at least 10 mol %, preferably at least 50 mol %, particularly preferably at least 90 mol % and very particularly preferably all, of the radicals R8 being alkyl radicals having from 1 to 10 carbon atoms. R8 is thus particularly preferably not hydrogen.

The various monomer units in the building blocks shown in the formulae (siloxane chains or polyoxyalkylene chain) can be arranged in blocks with any number of blocks and any sequence or have a random distribution. The indices used in the formulae are to be considered to be statistical means.

The compositions of the invention can contain further materials. In particular, the compositions of the invention can comprise further additives/auxiliaries as are used in polyurethane foam production. Preferred additives/auxiliaries which can be present in the compositions of the invention are preferably selected from among conventional SiOC and SiC stabilizers, organic foam stabilizers, surfactants, nucleating agents, cell-refining additives, cell openers, crosslinkers, emulsifiers, flame retardants, antioxidants, antistatics, biocides, colour pastes, solid fillers, amine catalysts, metal catalysts, polyols and/or buffer substances.

It can also be advantageous for the composition of the invention to contain a solvent, in particular an organic solvent, preferably a solvent selected from among glycols, alkoxylates and oils of synthetic and/or natural origin.

The compounds of formula (I) present in the composition can preferably be obtained by firstly preparing liquid (at a temperature of 25° C. and a pressure of 101 325 Pa), branched SiH-functional siloxanes by reacting a mixture containing
a) one or more SiH-functional siloxanes,
b) one or more SiH-function-free siloxanes, and
c) one or more tetraalkoxysilanes,
and/or
d) one or more trialkoxysilanes
with addition of water and in the presence of at least one solid Brönsted-acid catalyst selected from among acidic ion exchangers in one process step. The reaction can be carried out by a method based on the process described in DE 102008041601. The document mentioned is expressly incorporated by reference.

The process has to be carried out so that the reaction is incomplete and branched siloxane products which still have alkoxy groups are obtained. This can be achieved, for example, by the reaction being stopped before complete conversion is reached or by the starting materials being used in substoichiometric ratios so that not all alkoxy groups of the alkoxysilanes can be reacted. In particular, a molar ratio of water to alkoxy groups of less than 1:1 is used, with particular preference being given to a molar ratio of water to alkoxy groups of less than 0.5:1.

The preferred process preferably dispenses completely with the presence of solvents which are not miscible with water in equal parts by weight without phase separation. In particular, no alkanes or aromatic compounds are used as solvents in the process.

Instead of adding water in the process, it can be advantageous to add a mixture of water and one or more organic solvents which are miscible with water in equal parts by weight without phase separation. In this way, better compatibilization and thus better mixing of the water with the siloxanes and silanes can be achieved. However, good mixing can also be achieved by adding the water with particularly good mechanical mixing or introducing it in the form of vapour into the mixture of silanes and siloxanes, e.g., by bubbling steam into the mixture.

As organic solvents which are miscible with water in equal parts by weight without phase separation, preference is given to using alcohols, in particular alcohols having from 1 to 6 carbon atoms, preferably monohydric alcohols and particularly preferably methanol or ethanol, in particular ethanol. The solvent is preferably added in a sufficiently large amount for the water to be homogenized entirely or partly in the reaction mixture. If a mixture of water and an appropriate solvent such as, in particular, ethanol is used, the weight ratio of water to solvent in this mixture is preferably from 1:1 to 10:1, preferably from 2:1 to 5:1.

The preferred process is preferably used to prepare hydrogensiloxanes which are branched in the siloxane chain and have the general formula (II),

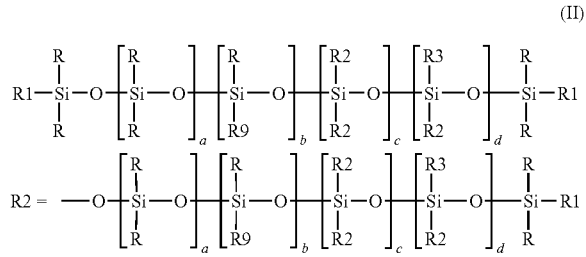

where
the indices a are each, independently of one another, from 0 to 500, preferably from 1 to 300, more preferably from 10 to 200,
the indices b are each, independently of one another, from 0 to 60, preferably from 0 to 30, more preferably >0, in particular from 1 to 15,
the indices c are each, independently of one another, from 0 to 10, preferably from 0 or >0 to 5,
the indices d are each, independently of one another, from 0 to 10, preferably from 0 or >0 to 5, more preferably from 1 to 5,
R is at least one radical from the group consisting of linear, cyclic or branched aliphatic or aromatic, saturated or unsaturated hydrocarbon radicals having from 1 to 20 carbon atoms, but preferably a methyl radical,
the radicals R1 are each, independently of one another, hydrogen, —OR8, or R,
the radicals R3 are each, independently of one another, hydrogen, R, —OR8, or a heteroatom-substituted, functional, organic, saturated or unsaturated radical, preferably a radical selected from the group consisting of alkyl, aryl, chloroalkyl, chloroaryl, fluoroalkyl, cyanoalkyl, acryloxyaryl, acryloxyalkyl, methacryloxyalkyl, methacryloxypropyl and vinyl radicals, particularly preferably a methyl, chloropropyl, vinyl or methacryloxypropyl radical, the radicals R9 are each, independently of one another, H or —OR8, the radicals R8 are each, independently of one another, hydrogen or an alkyl radical having from 1 to 10 carbon atoms, preferably a methyl, ethyl or isopropyl radical, with the proviso that when b=0 then R1=H, that $\Sigma c+\Sigma d>=1$ per molecule of formula (II) and that the average number $\Sigma d$ of the T units and the average number $\Sigma c$ of the Q units per molecule is in each case not greater than 50, preferably not greater than 20, more preferably not greater than 10, the average number $\Sigma a$ of the D units per molecule is not greater than 2000, preferably not greater than 1000 and more preferably not greater than 500, and the average number $\Sigma b$ of the siloxy units bearing R9 per molecule is not greater than 100, preferably not greater than 60, and in at least one of the compounds of formula (II) obtained at least one of the radicals R1, R3 and R9 is a radical —OR8 and averaged over all compounds of the formula (II) obtained not more than 20 mol % of the radicals R1, R3 and R9 are of the type —OR8. Particular preference is given to a being >0.

Preference is given to at least 10 mol %, more preferably at least 50 mol %, particularly preferably at least 90 mol % and very particularly preferably all, of the radicals R8 being alkyl radicals having from 1 to 10 carbon atoms. R8 is thus preferably not hydrogen.

For the purposes of the present invention, the averaged degree of branching k is the ratio of the number of M and $M^H$ units to T and Q units $(M+M^H)/(T+Q)$. The designation of the units corresponds to the internationally recognised nomenclature which may also be found, for example, in Thieme Römpp Online, Georg Thieme Verlag, 2008. According to this nomenclature, $M=R_3SiO_{1/2}$, $D=R_2SiO_{2/2}$, $T=RSiO_{3/2}$ and $Q=SiO_{4/2}$, where R are organic radicals. $M^H$ is a unit in which one of the radicals R is a hydrogen atom. $D^H$ is a unit in which one of the radicals R is a hydrogen atom. The degree of branching is determined by forming the ratio of the area integrals of the peaks assigned to the respective units in a $^{29}Si$-NMR spectrum.

The branched SiH-functional siloxanes obtained by the preferred process, preferably the branched SiH-functional siloxanes of the formula (II), can be ones in which the SiH functions are arranged purely terminally, purely laterally or mixed terminally and laterally in the siloxane.

As SiH-functional siloxanes, it is possible to use ones in which the SiH functions are arranged purely terminally, purely laterally or mixed terminally and laterally in the siloxane. As SiH-functional siloxanes, it is possible to use, for example, linear polymethylhydrogensiloxanes such as HMS-993 from Gelest Inc., linear polydimethylmethylhydrogensiloxanes such as HMS-031 and/or HMS-071 from Gelest Inc., linear α,ω-dihydrogenpolydimethylsiloxanes such as 1,1,3,3-tetramethyldisiloxane or 1,1,3,3,5,5-hexamethyltrisiloxane, relatively high molecular weight oligomers such as DMS-H03 and/or DMS-H11 from Gelest Inc., cyclic polymethylhydrogensiloxanes such as tetramethylcyclotetrasiloxane or pentamethylcyclopentasiloxane and cyclic polydimethylmethylhydrogensiloxanes such as heptamethylcyclotetrasiloxane and/or nonamethylcyclopentasiloxane, or mixtures thereof. Particular preference is given to using 1,1,3,3-tetramethyldisiloxane, DMS-H03, HMS-993 (each from Gelest Inc.) and pentamethylcyclopentasiloxane as SiH-functional siloxanes.

As SiH-function-free siloxanes, it is possible to use, for example, linear poly-dimethylsiloxanes such as hexamethyldisiloxane or cyclic polydimethylsiloxanes such as octamethylcyclotetrasiloxane and/or decamethylcyclopentasiloxane. Preference is given to using hexamethyldisiloxane and decamethylcyclopentasiloxane.

In a preferred embodiment of the preferred process, one or more tetraalkoxysilanes and one or more trialkoxysilanes are used. In a particularly preferred embodiment of the preferred process, one or more trialkoxysilanes and no tetraalkoxysilanes are used.

As tetraalkoxysilanes, it is possible to use all tetraalkoxysilanes, in particular tetramethoxysilane, tetraethoxysilane or tetraisopropoxysilane or condensates thereof. As tetraalkoxysilanes, it is possible to use ones in which the alkoxyl radicals are all identical, all different or partly identical. Particular preference is given to using tetraethoxysilane.

As trialkoxysilanes, it is possible to use all trialkoxysilanes, in particular ones in which the alkoxyl radicals are all identical, all different or partly identical. Particular preference is given to using triethoxysilanes, preferably alkyltriethoxysilanes such as methyltriethoxysilane, ethyltriethoxysilane, n-propyltriethoxysilane, isobutyltriethoxysilane, pentyltriethoxysilane, hexyltriethoxysilane, octyltriethoxysilane, hexadecyltriethoxysilane, n-octadecyltriethoxysilane, halogen-containing or pseudohalogen-containing alkyltrialkoxysilanes, in particular alkyltriethoxysilanes such as chloropropyltriethoxysilane, tridecafluoro-1,1,2,2-tetrahydrooctyltriethoxysilane, nonafluoro-1,1,2,2-tetrahydrohexyltriethoxysilane, 3-cyanopropyltriethoxysilane, trialkoxysilanes, in particular triethoxysilanes having functional groups, for example 3-methacryloxypropyltriethoxysilane, 3-mercapto-propyltriethoxysilane, 5-(bicycloheptenyl)triethoxysilane, aryltrialkoxysilanes, in particular aryltriethoxysilanes such as phenyltriethoxysilane, (p-chloromethyl)phenyltriethoxysilane, N-(3-triethoxysilylpropyl)-4,5-dihydroimidazole or dihydro-3-[3-(triethoxysilyl)propyl]furan-2,5-dione.

Preference is given to using exclusively starting materials a) to d) which are present as liquids under normal conditions.

The proportions of chain-terminating trialkylsiloxy units, in particular trimethylsiloxy units (M units) and/or dialkylhydrogensiloxy units, in particular dimethylhydrogensiloxy units ($M^H$ units), dialkylalkoxysiloxy units ($M^{OR}$ units), in particular dimethylethoxysiloxy units ($M^{OEt}$ units), of chain-extending dialkylsiloxy units, in particular dimethylsiloxy units (D units) and/or alkylhydrogensiloxy units, in particular methylhydrogensiloxy units ($D^H$ units), alkylalkoxysiloxy units ($D^{OR}$ units), in particular methylethoxysiloxy units ($D^{OEt}$ units), and of chain-branching siloxy units (Q units) and, if appropriate, of branching alkylsiloxy units (T units) and/or T units substituted by functional groups can be varied over a wide range. The molar ratio of the sum of M units and $M^H$ units to Q units is preferably from 4:1 to 1.8:1. If the molar ratio of Q units to the M and $M^H$ units is increased beyond this limiting ratio, undesirable, macromolecular, strongly crosslinked gels to resins may be obtained. The molar ratio of the sum of M units and $M^H$ units to T units is preferably from 3:1 to 1:1. If the molar ratio of T units to the M and $M^H$ units is increased beyond this limiting ratio, undesirable, macromolecular, strongly crosslinked gels to resins may be obtained.

The reaction mixture can be obtained by mixing of the components in any way. Preference is given to firstly mixing the SiH-functional siloxanes, the SiH-function-free siloxanes, the tetraalkoxysilanes and, if appropriate, the trialkoxysilanes or the substituted trialkoxysilanes.

After mixing of the starting materials, i.e., the SiH-functional siloxanes, the SiH-function-free siloxanes and the tetraalkoxysilanes and, if appropriate, trialkoxysilanes, at least one Brönsted-acid catalyst is preferably added to catalyse the hydrolysis and condensation. The catalyst can be entirely or partly added directly to the reaction mixture or can be introduced during the reaction in any order.

Preference is given to firstly mixing the starting materials, then adding the catalyst and subsequently adding the water or the aqueous mixture.

As acidic ion exchangers, it is possible to use the ion exchangers known from the prior art. In the preferred process, it is possible to use either natural ion exchangers such as zeolites, montmorillonites, attapulgites, bentonites and other aluminium silicates or synthetic ion exchangers. The latter are preferably solids (usually in particulate form) having a three-dimensional, water-insoluble high molecular weight matrix based on phenol-formaldehyde resins or copolymers of styrene-divinylbenzene into which numerous "anchor groups" of varying acidity are built. In particular, acidic aluminas or acidic ion-exchange resins such as the products known under the trade names Amberlite®, Amberlyst® or Dowex® and Lewatit® can be used. Particular preference is given to using a sulphonic acid ion-exchange resin as acidic ion exchanger.

As acidic ion exchangers, preference is given to using those described in EP 1 439 200 in the preferred process. This document and the documents cited therein as prior art are hereby incorporated by reference as part of the disclosure content of the present invention.

It can be advantageous to use at least one solid acidic ion exchanger (catalyst 1) and at least one further, nonsolid Brönsted-acid catalyst (catalyst 2), in particular a liquid acid, as catalyst in the preferred process. As catalyst 2, it is possible to use a mineral acid, preferably sulphuric acid, and/or preferably an organic sulphonic acid, preferably trifluoromethanesulphonic acid. This catalyst mixture is preferably added directly to the reaction mixture. Preference is given to using a mixture of trifluoromethanesulphonic acid and a sulphonic acid ion-exchange resin, preferably Lewatit® K 2621 (Bayer Material Science) as catalyst. The catalyst mixture preferably has a mass ratio of catalyst 1 to catalyst 2 of from 10:1 to 100:1. This mass ratio is particularly preferred when using a Lewatit® catalyst as catalyst 1 and trifluoromethanesulphonic acid as catalyst 2.

If the two catalysts 1 and 2 are used as catalyst, it can be advantageous firstly to add catalyst 2, preferably in its entirety, to the mixture of starting materials, subsequently add water and only after preferably all the water has been added add catalyst 1. However, catalysts 1 and 2 can also both be added to the starting materials before addition of the water.

In the preferred process, acidic catalyst is preferably added to the reaction mixture in such an amount that the sum of the acidic catalysts used makes up from 0.01 to 10% by weight of the sum of the mass of starting materials used (i.e., the sum of the SiH-functional siloxanes, the SiH-function-free siloxanes, the tetraalkoxysilanes and if appropriate the trialkoxysilanes). Depending on the type and concentration of the catalyst used, particular subranges of this range can be preferred. Particular preference is given, for example, to the use of trifluoromethanesulphonic acid in amounts of from 0.05% by weight to 0.5% by weight. If an ion-exchange resin alone is used as catalyst, the mass of catalyst used is preferably from 0.5 to 15% by weight. If a combination of mineral acid and/or organic sulphonic acid with an ion-exchange resin is used as catalyst, the mass of ion-exchange resin used is preferably from 0.5 to 15% by weight, more preferably from 0.5 to 5% by weight.

In the preferred process, preference is given to using from 0.5 to 30 mol of water per mole of alkoxysilane used. Preference is given to using from 0.5 to 6 mol of water per mole of alkoxysilane for the hydrolysis and condensation. The water can be added in one step or preferably be introduced over a relatively long period of time. Due to the amount of water selected, phase separation usually does not occur.

The reaction in the preferred process is preferably carried out at a temperature of from 0° C. to 100° C. The reaction (simultaneous hydrolysis, condensation and equilibration reactions) is preferably carried out at a temperature of from 20° C. to 60° C.

After the reaction is complete, the volatile by-products of the condensation can be removed, e.g., by vacuum distillation under mild conditions. If necessary or desired, neutralisation can be carried out, e.g., by means of a basic salt, preferably sodium hydrogencarbonate.

The preferred hydrogensiloxanes having a branched chain which are obtained in this way are preferably stable, clear, colourless liquids which preferably contain no or at least only small proportions of volatile low molecular weight compounds. The SiH equivalents weighed in via the starting mixture, i.e., the SiH equivalents measured before the reaction, and the SiH equivalents measured in the hydrogensiloxanes prepared by the preferred process (i.e., after the reaction) agree within analytical accuracy, which demonstrates that the SiH functions used have been largely retained. Preferred hydrogensiloxanes which have a branched chain preferably have more than 95%, preferably more than 97%, of the theoretically possible hydrogen content (Si—H hydrogen). The hydrogen content can be determined gas-volumetrically after the hydrogen has been quantitatively liberated by decomposition of the SiH-containing material in alcoholic alkali solution (see also reaction equation in Eaborn, p. 200).

The preferred process makes it possible to prepare hydrogensiloxanes which have a branched siloxane chain, in particular those of the formula (I). The hydrogensiloxanes having a branched siloxane chain preferably have a viscosity, measured by means of a Haake RV12 rotational viscometer at 25° C., of from 10 to 1000 mPa*s, preferably from 20 to 500 mPa*s and particularly preferably from 20 to 250 mPa*s. The branched hydrogensiloxanes preferably contain an average of from 1 to 10, more preferably from 1 to 5, branching units (Q and T units). The preferred hydrogensiloxanes having a branched siloxane chain can be used for preparing organomodified polysiloxanes having a branched siloxane chain.

The hydrogensiloxanes having a branched siloxane chain of formula (II) can be reacted with compounds having at least one, preferably precisely one, double bond per molecule by noble metal-catalysed, in particular platinum-catalysed, hydrosilylation. This is surprising and unforeseeable to a person skilled in the art since the alkoxy functions of the siloxane are largely retained during hydrosilylation and do not, as expected, lead to dissociation and crosslinking reactions under the conditions of noble metal catalysis at elevated temperatures. The copolymers of general formula (I) (see above) present in the composition of the invention can be obtained by means of this reaction.

The noble metal-catalysed hydrosilylation of the branched hydrogensiloxanes according to the invention can, for example, be carried out as described in the prior art, e.g., in EP 1 520 870. The document EP 1 520 870 is hereby incorporated by reference into the disclosure content of the present invention.

As compounds which have at least one double bond per molecule, it is possible to use, for example, α-olefins, vinylpolyoxyalkylenes and/or allylpolyoxyalkylenes. Preference is given to using vinylpolyoxyalkylenes and/or allylpolyoxyalkylenes. Particularly preferred vinylpolyoxyalkylenes are, for example, vinylpolyoxyalkylenes having a molecular weight in the range from 100 g/mol to 5000 g/mol which can be made up of the monomers propylene oxide, ethylene oxide, butylene oxide and/or styrene oxide arranged in blocks or distributed randomly and can be terminated either by a hydroxyl function or by a methyl ether function or an acetoxy function. Particularly preferred allylpolyoxyalkylenes are, for example, allylpolyoxyalkylenes having a molecular weight in the range from 100 g/mol to 5000 g/mol which can be made up of the monomers propylene oxide, ethylene oxide, butylene oxide and/or styrene oxide arranged in blocks or distributed randomly and can be terminated either by a hydroxyl function or by a methyl ether function or an acetoxy function. Particular preference is given to using the α-olefins, allyl alcohol, 1-hexenol, vinylpolyoxyalkylenes and/or allylpolyoxyalkylenes and also allyl glycidyl ether and vinylcyclohexene oxide mentioned in the examples as compounds having at least one double bond per molecule.

The compositions of the invention which contain organomodified and in particular polyether-modified, branched siloxanes ($\Sigma c+\Sigma d \geq 1$) can be used either alone or in admixture with other, unbranched organomodified siloxanes ($\Sigma c+\Sigma d=0$) as valuable surface-active ingredients in industrial applications. In particular, the blending described here allows the definition of a broad spectrum of activity of such surfactants which can be employed in the production of polyurethane foams, e.g., as foam stabilizers.

It goes without saying that the blending of the organomodified and in particular polyether-modified, branched siloxanes of the invention ($\Sigma c+\Sigma d \geq 1$) with unbranched siloxanes makes it possible to obtain mixtures which are valuable surface-active ingredients but can, depending on the mixing ratio, have a total of less than one branching unit per molecule ($\Sigma c+\Sigma d<1$). It is of course also possible to mix the organomodified and in particular polyether-modified, branched siloxanes of the invention ($\Sigma c+\Sigma d \geq 1$) with SiOC-bonded polyether-siloxanes and/or silicon-free compounds such as solvents, in particular glycols or polyethers, organic foam stabilizers and surfactants, nucleating agents, cell-refining additives, cell openers, blowing agents, crosslinkers, emulsifiers, flame retardants, antioxidants, antistatics, biocides, colour pastes, solid fillers, amine catalysts, metal catalysts, polyols, and/or buffer substances within a wide range. Such mixtures, too, can be valuable surface-active compositions. The average molecular degree of branching determined by $^{29}$Si-NMR naturally does not change here.

The compositions of the invention can be used as surface-active substances in all fields. The compositions of the invention are preferably used in polyurethanes. The compositions of the invention are more preferably used in polyurethane foams, in particular in rigid polyurethane foams, flexible polyurethane foams, viscoelastic foams, HR foams, semi-rigid polyurethane foams, thermoformable polyurethane foams or integral foams, particularly preferably as foam stabilizer.

The compositions of the invention are preferably added as a foam stabilizer in the process of the invention for producing polyurethane foam. The composition is preferably added in such an amount that the proportion by mass of compounds of formula (I) in the finished polyurethane foam is from 0.01 to 10% by weight, preferably from 0.1 to 3% by weight.

The compositions of the invention can be used as foam stabilizers in customary formulations for producing polyurethane foams, which comprise one or more organic isocyanates having two or more isocyanate functions, one or more polyols having two or more groups which are reactive toward isocyanate, catalysts for the isocyanate-polyol and/or isocyanate-water reactions and/or isocyanate trimerization, water, optionally physical blowing agents, optionally flame retardants and, if appropriate, further additives.

Isocyanates suitable for the purposes of the present invention are all polyfunctional organic isocyanates such as diphenylmethane 4,4'-diisocyanate (MDI), tolylene diisocyanate (TDI), hexamethylene diisocyanate (HMDI) and isophorone diisocyanate (IPDI). The mixture of MDI and more highly condensed analogues having an average functionality of from 2 to 4 which is known as "polymeric MDI" ("crude MDI") and also the various isomers of TDI in pure form or as a mixture of isomers are particularly suitable.

Polyols suitable for the purposes of the present invention are all organic substances having a plurality of groups which are reactive toward isocyanates, and also preparations in which they are present. Preferred polyols are all polyether polyols and polyester polyols which are customarily used for producing polyurethane foams. Polyether polyols are obtained by reaction of polyhydric alcohols or amines with alkylene oxides. Polyester polyols are based on esters of polybasic carboxylic acids (which may be either aliphatic, for example adipic acid, or aromatic, for example phthalic acid or terephthalic acid) with polyhydric alcohols (usually glycols).

A suitable ratio of isocyanate to polyol, expressed as index of the formulation, i.e., as stoichiometric ratio of isocyanate groups to groups which are reactive toward isocyanate (e.g. OH groups, NH groups) multiplied by 100, is in the range from 10 to 1000, preferably from 80 to 350. At an index of 100, all isocyanate groups therefore react.

Catalysts suitable for the purposes of the present invention are substances which catalyse the gelling reaction (isocyanate-polyol), the blowing reaction (isocyanate-water) or the dimerisation or trimerisation of the isocyanate. Typical examples are the amines triethylamine, dimethylcyclohexylamine, tetramethylethylenediamine, tetramethyl-hexanediamine, pentamethyldiethylenetriamine, pentamethyldipropylenetriamine, triethylenediamine, dimethylpiperazine, 1,2-dimethylimidazole, N-ethylmorpholine, tris(dimethylaminopropyl)hexahydro-1,3,5-triazine, dimethylaminoethanol, dimethylaminoethoxyethanol and bis(dimethylaminoethyl)ether, tin compounds such as dibutyltin dilaurate or tin(II) 2-ethylhexanoate and potassium salts such as potassium acetate and potassium 2-ethylhexanoate.

Suitable amounts to be added depend on the type of catalyst and are usually in the range from 0.05 to 5 pphp (=parts by weight per 100 parts by weight of polyol) or from 0.1 to 10 pphp for potassium salts.

Water contents which are suitable for the purposes of the present invention depend on whether or not physical blowing agents are used in addition to the water. In the case of purely water-blown foams, the values are typically from 1 to 20 pphp, but when other blowing agents are used in addition, the amount used is reduced to usually from 0.1 to 5 pphp.

Physical blowing agents suitable for the purposes of the present invention are gases, for example liquefied $CO_2$, and volatile liquids, for example hydrocarbons having 4 or 5 carbon atoms, preferably cyclopentane, isopentane and n-pentane, fluorinated hydrocarbons, preferably HFC 245fa, HFC 134a and HFC 365mfc, chlorofluorocarbons, preferably HCFC 141b, oxygen-containing compounds such as methyl formate and dimethoxymethane or chlorocarbons, preferably dichloromethane and 1,2-dichloroethane.

Apart from water and, if appropriate, physical blowing agents, it is also possible to use other chemical blowing agents which react with isocyanates to generate gas, for example formic acid.

Flame retardants suitable for the purposes of the present invention are preferably liquid organic phosphorus compounds such as halogen-free organic phosphates, e.g., triethyl phosphate (TEP), halogenated phosphates, e.g. tris(1-chloro-2-propyl) phosphate (TCPP) and tris(2-chloroethyl)phosphate (TCEP), and organic phosphonates, e.g., dimethyl methanephosphonate (DMMP), dimethyl propanephosphonate (DMPP), or solids such as ammonium polyphosphate (APP) and red phosphorus. Further suitable flame retardants are halogenated compounds, for example halogenated polyols, and also solids such as expandable graphite and melamine.

The processing of the formulations according to the invention to produce foams can be carried out by all methods with which those skilled in the art are familiar, for example by manual mixing or preferably with the aid of high-pressure foaming machines. It is possible to use batch processes, for example for the production of moulded foams, refrigerators and panels, or continuous processes, for example for insulation boards, metal composite elements, blocks, or spray processes.

A special case is represented by the 1- and 1.5-component pressure-pack foams in which a polyurethane prepolymer is used. In this application, too, the compositions of the invention can be used as foam stabilizers.

The polyurethane foams of the invention are characterized in that they have or contain a composition according to the invention. The proportion by mass of compounds of formula (I) in the finished polyurethane foam is preferably from 0.01 to 10% by weight, more preferably from 0.1 to 3% by weight.

The polyurethane foams of the invention can be, for example, a rigid polyurethane foam, a flexible polyurethane foam, a viscoelastic foam, an HR foam, a semirigid polyurethane foam, a thermoformable polyurethane foam or an integral foam. The term polyurethane is used here as a collective term for a polymer produced from diisocyanates or polyisocyanates and polyols or other species which are reactive toward isocyanate, e.g., amines, with the urethane bond not having to be the exclusive or predominant type of bonding. Polyisocyanurates and polyureas are expressly also encompassed.

The polyurethane foams of the invention can be used, for example, as refrigerator insulation, insulation board, sandwich element, pipe insulation, spray foam, 1- & 1.5-component pressure-pack foam, imitation wood, modelling foam, packing foam, mattresses, furniture upholstery, automobile seat cushion, headrest, dashboard, automobile interior trim, automobile roof lining, sound absorption material, steering wheel, shoe sole, carpet backing foam, filter foam, sealing foam and adhesive.

The present invention is described by way of example in the following examples, without the invention, whose scope is defined by the total description and the claims, being restricted to the embodiments mentioned in the examples.

EXAMPLES

The proportion of alkoxy radicals —OR8 is defined according to formula (I) as the proportion of —OR8 in the sum of the radicals R4, R5 and R7. The molar fraction of alkoxy radicals —OR8 was determined by calculating the ratio of the respective area integrals in a $^{29}$Si-NMR spectrums. It is possible to employ either the spectrum of the end product (formula (I)) or of the hydrogensiloxane serving as precursor (formula (II)), since the alkoxyl radicals are largely retained during the hydrosilylation. The $^{29}$Si-NMR measurement, with which a person skilled in the art will be familiar, is of greater accuracy at the stage of the hydrogensiloxane because of the lower dilution of the silicone part. The structures disclosed here were determined by measurement of the hydrogensiloxane and calculating the ratio of the appropriate integrals.

Examples 1 to 7

Preparation of Compositions of the Invention

The hydrogensiloxanes were prepared by means of the process described in the present text and the process described in the as yet unpublished patent applications DE 102008041601 and DE 102007055485.2. The amounts of siloxane and silane starting materials used were calculated according to the proportions of monomeric siloxy units required in the respective illustrative formulation. The preparation was carried out by a method analogous to Example 1 of DE 102008041601. The amount of water was calculated so that the reaction did not proceed to 100%. Instead of one equivalent of water per silane-bonded alkoxy equivalent, a maximum of 0.5 equivalent of water per silane-bonded alkoxy equivalent was used in each case. In the introduction of very small amounts via a dropping funnel, retention of substance on the wetted glass wall or the greased glass stopcock cannot be avoided without the undesirable use of additional solvent and the actual amounts of water in the flask are therefore slightly below the calculated stoichiometry of the batch.

In a second step, these hydrogensiloxanes were converted by hydrosilylation by means of the allyl polyethers indicated in Table 1 into compounds of formula I. The preparation was carried out by a method analogous to Example 7 of DE 1020070554852 and therefore in accordance with the prior art for preparing SiC-bonded polyethersiloxanes, as described, for example, in EP 1520870.

TABLE 1

Allyl polyethers used for preparing the compounds in Table 2 (EO: ethylene oxide, PO: propylene oxide)

| Polyether | Molecular weight | Starter | End group | Proportion of EO | Proportion of PO |
|---|---|---|---|---|---|
| PE 1 | 600 g/mol | Allyl alcohol | Hydroxy function | 100 | 0 |
| PE 2 | 1500 g/mol | Allyl alcohol | Hydroxy function | 40 | 60 |
| PE 3 | 1500 g/mol | Allyl alcohol | Methoxy function | 40 | 60 |
| PE 4 | 400 g/mol | Allyl alcohol | Methoxy function | 100 | 0 |
| PE 5 | 900 g/mol | Allyl alcohol | Methoxy function | 74 | 26 |
| PE 6 | 4000 g/mol | Allyl alcohol | Methoxy function | 40 | 60 |

The structure of the compound obtained can be seen in Table 2. The parameters reported in Table 2 relate to the abovementioned formula (I).

TABLE 2

Compositions of the compounds of the formula (I) obtained in Examples 1 to 7

| Ex. | R | Σa | R5 | Proportion of OR8 [mol %] | R7 | Σc | Σd | Σb | R4 |
|---|---|---|---|---|---|---|---|---|---|
| 1 | CH3 | 69 | PE 1, OR8 | 4.9 | CH3 | 0 | 4.5 | <<1 | OR8 |
| 2 | CH3 | 52 | PE 1, OR8 | 3.9 | CH3 | 0 | 3.3 | <<1 | OR8 |
| 3 | CH3 | 68 | PE 1, OR8 | 1.5 | CH3 | 0 | 5 | <<1 | OR8 |
| 4 | CH3 | 68 | PE 2, OR8 | 1.5 | CH3 | 0 | 5 | <<1 | OR8 |

TABLE 2-continued

Compositions of the compounds of the formula (I) obtained in Examples 1 to 7

| Ex. | R | Σa | R5 | Proportion of OR8 [mol %] | R7 | Σc | Σd | Σb | R4 |
|---|---|---|---|---|---|---|---|---|---|
| 5 | CH3 | 68 | PE 3, OR8 | 1.5 | CH3 | 0 | 5 | <<1 | OR8 |
| 6 | CH3 | 2 | R, OR8 | 1.5 | Phenyl | 0 | 1 | <<1 | OR8 |
| 7 | CH3 | 2 | R, PE 4, OR8 | 1.5 | Phenyl | 0 | 1 | <<1 | OR8 |
| 8 | CH3 | 68 | PE mix*, OR8 | 1.5 | CH3 | 0 | 5 | <<1 | OR8 |

*Mixture consisting of 12.4% by weight of PE 3, 13.1% by weight of PE 5 and 74.5% by weight of PE 6.

Foaming Examples

The foaming examples described below were carried out using the products indicated in Table 3, which can be procured from Evonik Goldschmidt GmbH (Evonik), as compositions which are not according to the invention (foam stabilizers).

TABLE 3

Comparative examples not according to the invention

| Product name | Manufacturer | Structure type |
|---|---|---|
| TEGOSTAB ® B 1048 | Evonik | SiOC, branched siloxane |
| TEGOSTAB ® BF 2270 | Evonik | SiOC, branched siloxane |
| TEGOSTAB ® B 8404 | Evonik | SiC, linear siloxane |
| TEGOSTAB ® B 8870 | Evonik | SiC, linear siloxane |
| TEGOSTAB ® B 8871 | Evonik | SiC, linear siloxane |
| TEGOSTAB ® B 8724 LF2 | Evonik | linear siloxane |
| TEGOSTAB ® B 8726 LF2 | Evonik | SiC, linear siloxane |

Example 8

Application Area of Rigid Foam Panel and Insulation Board

Two different formulations which were matched to these fields of use and whose composition is indicated in Table 4 were used.

TABLE 4

Formulations for rigid foam panel/insulation board, in parts by mass

| Formulation | A: PUR panel | B: PIR insulation board |
|---|---|---|
| Polyol | Polyether polyol blend 70 parts | Stepanpol PS 2352* 100 parts |
| Tris(1-chloro-2-propyl) phosphate | 30 parts | 15 parts |
| N,N,N',N'',N''-Pentamethyldiethylenetriamine | 0.2 part | 0.2 part |
| N,N-Dimethylcyclohexylamine | 2.0 parts | — |
| Potassium octoate (75% by weight in diethylene glycol) | — | 4.0 parts |
| Water | 1.0 part | 0.4 part |
| n-Pentane | 6.0 parts | 20 parts |
| Stabilizer | 2.0 parts | 2.0 parts |
| Desmodur 44V20L** | 140 parts | 200 parts |

*Polyester polyol from Stepan
**Polymeric MDI from Bayer, 200 mPa * s, 31.5% of NCO, functionality: 2.7

A masterbatch of each of the two systems was firstly made up from polyol, flame retardant, catalysts and water and in each case divided into 6 equal parts. Two of each were admixed with the appropriate amount of the foam stabilizer according to the invention, two further portions were admixed with a conventional SiOC foam stabilizer (comparative example not according to the invention) and the last two were admixed with a conventional linear SiC foam stabilizer (comparative example not according to the invention). For each system, a set of three samples containing the different stabilizers was foamed directly after making up. The second set was, in order to simulate a relatively long storage time, subjected to accelerated ageing at 70° C. for one week and then foamed. This gave, for each system and stabilizer, one data set for fresh samples and a further data set for aged samples.

The comparative foaming experiments were carried out by manual mixing. For this purpose, the polyol formulation prepared as described with stabilizer was weighed into a cup, the required amount of blowing agent was added and the mixture was mixed by means of a plate stirrer (6 cm diameter) at 1000 rpm for 30 s. The amount of blowing agent which had evaporated during mixing was determined by renewed weighing and was replaced again. The MDI was now added, the reaction mixture was stirred with the stirrer described at 3000 rpm for 5 s and immediately transferred into an aluminium mould which had dimensions of 50 cm×25 cm×5 cm, was lined with polyethylene film and was thermostatted at 50° C. The amount of foam formulation used was calculated so that it was 10% above the amount necessary for minimum filling of the mould.

One day after foaming, the foams were analysed. Surface and internal defects were assessed subjectively on a scale from 1 to 10, where 10 represents a defect-free foam and 1 represents a foam having an extremely large number of defects. The pore structure (average number of cells per 1 cm) was assessed visually on a cut surface by comparison with comparative foams. The thermal conductivity was measured on 2.5 cm thick discs by means of a Hesto λ Control instrument at temperatures on the underside and upper side of the specimen of 10° C. and 36° C. The percentage by volume of closed cells was determined by means of an AccuPyc 1330 instrument from Micromeritics. The compressive strengths of the foams were measured on cube-shaped test specimens having an edge length of 5 cm in accordance with DIN 53421 to a compression of 10% (the FIGURE reported is the maximum compressive stress which occurs in this measurement range). A plurality of test specimens was in each case loaded in the rise direction of the foam. The results of this test are shown in Table 5.

TABLE 5

Results for Example 8

| Stabilizer | Defects top/bottom/interior | cells/cm | λ [mW/m* K] | Proportion of closed cells [%] | Compressive strength [kPa] | Density [kg/m³] overall/core |
|---|---|---|---|---|---|---|
| Formulation A (PUR panel) foamed fresh after preparation | | | | | | |
| According to Ex. 5 | 8/9/7 | 46-50 | 22.0 | 93.6 | 175 | 42.8/38.6 |
| B 1048 | 7/9/7 | 41-45 | 22.2 | 93.5 | 180 | 42.5/38.7 |
| B 8404 | 7/8/7 | 41-45 | 22.5 | 92.4 | 185 | 43.1/38.9 |
| Formulation A (PUR panel) foamed after ageing (one week at 70° C.) | | | | | | |
| According to Ex. 5 | 8/9/7 | 46-50 | 22.2 | 92.1 | 170 | 42.8/38.6 |
| B 1048 | 5/4/6 | 31-35 | 24.7 | 79.4 | 200 | 42.5/38.7 |
| B 8404 | 7/8/7 | 41-45 | 22.6 | 91.9 | 180 | 43.1/38.9 |
| Formulation B (PIR insulation board) foamed fresh after preparation | | | | | | |
| According to Ex. 1 | 6/8/9 | 46-50 | 22.6 | 94.0 | 165 | 38.4/35.0 |
| B 1048 | 6/8/9 | 46-50 | 22.5 | 93.1 | 165 | 38.3/35.1 |
| B 8404 | 6/8/8 | 41-45 | 22.9 | 91.9 | 175 | 37.9/35.1 |
| Formulation B (PIR insulation board) foamed after ageing (one week at 70° C.) | | | | | | |
| According to Ex. 1 | 6/7/9 | 46-50 | 22.5 | 91.2 | 170 | 38.5/35.2 |
| B 1048 | 4/4/5 | 26-30 | 25.5 | 82.5 | 140 | 39.2/37.0 |
| B 8404 | 6/8/9 | 41-45 | 22.7 | 93.1 | 170 | 38.3/35.0 |

The data in Table 5 show that rigid foams of good quality can be obtained using the foam stabilizer according to the invention. The comparatively fine cells of the rigid foams produced according to the invention confirm the high activity of the foam stabilizers of the invention, which is retained even after ageing of the fully formulated polyol component with stabilizer. On the other hand, in the case of the comparative example which is not according to the invention using an SiOC foam stabilizer according to the prior art, a significant deterioration in the foam quality after ageing of the polyol component is observed.

Example 9

Field of Application of Insulation of Refrigeration Appliances

The foam formulation indicated in Table 6 was used for the use-related comparison of foam stabilizers according to the invention and conventional foam stabilizers.

TABLE 6

Formulations for refrigerator insulation

| Component | Amount used |
|---|---|
| Daltolac R 471* | 95 g (100 parts) |
| N,N-Dimethylcyclohexylamine | 1.4 g (1.5 parts) |
| Water | 2.5 g (2.6 parts) |
| Cyclopentane | 12.4 g (13.1 parts) |
| Stabilizer | 1.4 g (1.5 parts) |
| Desmodur 44V20L** | 188.6 g (198.5 parts) |

*Polyether polyol from Huntsman
**Polymeric MDI from Bayer, 200 mPa * s, 31.5% of NCO, functionality: 2.7

The comparative foaming experiments were carried out by manual mixing. For this purpose, polyol, catalysts, water, conventional foam stabilizer or foam stabilizer according to the invention and blowing agent were weighed into a cup and mixed by means of a plate stirrer (6 cm diameter) at 1000 rpm for 30 s. The amount of blowing agent which had evaporated during mixing was determined by renewed weighing and was replaced again. The MDI was now added, the reaction mixture was stirred by means of the stirrer described at 3000 rpm for 5 s and immediately transferred to an aluminium mould which had dimensions of 145 cm×14 cm×3.5 cm, was inclined at an angle of 10° (along the 145 cm side), was lined with polyethylene film and was thermostatted to 45° C. The foam formulation was introduced at the lower side so that the expanding foam fills the mould in the region of introduction and rises in the direction of the higher side. The amount of foam formulation used was calculated so that it was below the amount required for minimum filling of the mould. The length of the foam moulding obtained after curing can thus be employed, standardized according to the weight, as a measure of the volume yield.

After 10 minutes, the foams were taken from the mould and analysed. Surface and internal defects were assessed subjectively on a scale from 1 to 10, where 10 represents a defect-free foam and 1 represents a foam having an extremely large number of defects. The pore structure (average number of cells per 1 cm) was assessed visually on a cut surface by comparison with comparative foams. The flow length (as a measure of the volume yield) was determined by measuring the foam moulding and, to allow better comparison, standardized according to the following formula to a standard weight of 260 g and atmospheric pressure:

Reduced flow length=foam length*260 g*atmospheric pressure/(foam weight*1013 mbar)

All foam stabilizers used in Example 9 and the associated foaming results are shown in Table 7.

TABLE 7

Results for Example 9 (refrigerator insulation)

| Cell stabilizer | Foam quality in terms of defects | | | Cell fineness [cells/cm] | Reduced flow length [cm] |
|---|---|---|---|---|---|
| | Upper side | Underside | Interior | | |
| According to Ex. 4 | 5 | 5 | 7 | 36-40 | 129.9 |
| TEGOSTAB B 1048 | 5 | 5 | 7 | 36-40 | 129.1 |
| TEGOSTAB B 8404 | 4 | 5 | 7 | 36-40 | 128.5 |

The results demonstrate that rigid foams for refrigerator applications can be produced using the preparations according to the invention. Here, equally good results in respect of surface quality and cell fineness and even improved results in respect of flowability and volume yield were obtained compared to foam stabilizers according to the prior art.

Example 10

Field of Application of Open-Celled (Semi)Rigid Foam

The foam formulation indicated in Table 8 was used for the use-related comparison of foam stabilizers according to the invention and conventional foam stabilizers in open-celled rigid foam.

TABLE 8

Formulations for open-celled (semi)rigid foam

| Component | Amount used |
|---|---|
| Daltolac R 251* | 35 g |
| Voranol RN 490** | 35 g |
| Desmophen VP.PU 44WB03*** | 25 g |
| Dipropylene glycol | 5 g |
| N,N-Dimethylaminoethanol | 0.5 g |
| Triethylenediamine 33% strength in dipropylene glycol | 0.5 g |
| Water | 4 g |
| TEGOSTAB B 8523‡ | 1 g |
| Stabilizer | 1 g |
| Desmodur 44V20L‡‡ | 134 g |

*Polyether polyol from Huntsman
**Polyether polyol from DOW
***Polyether polyol from Bayer
‡Cell opener from Evonik Goldschmidt GmbH
‡‡Polymeric MDI from Bayer, 200 mPa * s, 31.5% of NCO, functionality: 2.7.

The comparative foaming experiments were carried out by manual mixing. For this purpose, polyols, catalysts, water, cell opener and conventional foam stabilizer or foam stabilizer according to the invention were weighed into a cup and mixed by means of a plate stirrer (6 cm diameter) at 1000 rpm for 30 s. The MDI was now added, the reaction mixture was stirred by means of the stirrer described at 3000 rpm for 5 s and immediately transferred to a wooden box which was open at the top and had a base area of 27 cm×14 cm and a height of 14 cm and was lined with paper.

After 10 minutes, the foams were taken from the mould and analysed. Surface and internal defects were assessed subjectively on a scale from 1 to 10, where 10 represents a defect-free foam and 1 represents a foam having an extremely large number of defects. The pore structure (average number of cells per 1 cm) was assessed visually on a cut surface by comparison with comparative foams. The volume percentage of open cells was determined by means of an AccuPyc 1330 instrument from Micromeritics.

The foam stabilizers used and the associated foaming results are shown in Table 9.

TABLE 9

Results for open-celled (semi)rigid foam

| Cell stabilizer | Foam quality in terms of defects | | | Cell fineness [cells/cm] | Proportion of open cells [%] |
|---|---|---|---|---|---|
| | Upper side | Underside | Interior | | |
| According to Ex. 2 | Well blown off | 5 | 8 | 36-40 | 93.9 |
| TEGOSTAB B 8871 | Well blown off | 4 | 7 | 36-40 | 93.1 |

The results demonstrate that open-celled rigid foams having a high proportion of open cells and comparatively few foam defects can be produced using the foam stabilizers according to the invention.

Example 11

Field of Application of Spray Foam

The foam formulation of a purely water-blown lightweight spray foam shown in Table 10 was used for the use-related comparison of foam stabilizers according to the invention and conventional foam stabilizers.

TABLE 10

Formulations for spray foam

| Component | Amount used (parts by mass) |
|---|---|
| Castor oil | 25.0 parts |
| Stepan PS 1922* | 7.5 parts |
| Jeffol R-470 X** | 7.0 parts |
| Tris(1-chloro-2-propyl) phosphate | 20.0 parts |
| PHT-4-diol*** | 10.0 parts |
| Tegoamine BDE‡ | 3.0 parts |
| Tegoamine 33‡ | 2.5 parts |
| Tegoamine DMEA‡ | 3.0 parts |
| Water | 19.0 parts |
| Stabilizer | 3.0 parts |
| Rubinate M‡‡ | 100 parts |

*Polyester polyol from Stepan
**Mannich base-initiated polyether polyol from Huntsman
***Flame retardant from Chemtura
‡Amine catalysts from Evonik Goldschmidt GmbH
‡‡Polymeric MDI from Huntsman, 190 mPa * s, 31.2% of NCO, functionality: 2.7

The comparative foamings were carried out by manual mixing. For this purpose, polyols, catalysts, water, flame retardant and conventional foam stabilizer or foam stabilizer according to the invention were weighed into a cup and mixed by means of a plate stirrer (6 cm diameter) at 1000 rpm for 30 s. The MDI was now added, the reaction mixture was stirred by means of the stirrer described at 3000 rpm for 3 s and immediately transferred into a wooden box which was open at the top and had a base area of 27 cm×14 cm and a height of 14 cm and was lined with paper.

After 10 minutes, the foams were taken from the mould and analysed. The cell structure was assessed subjectively on a scale from 1 to 10, where 10 represents a very fine-celled and defect-free foam and 1 represents a coarse foam having an extremely large number of defects. The percentage by volume of open cells was determined by means of an AccuPyc 1330 instrument from Micromeritics. The density was determined by weighing of a 10 cm×10 cm×10 cm foam cube.

All foam stabilizers used and the associated foaming results are shown in Table 11.

TABLE 11

Results for spray foam (Example 11)

| Stabilizer | Cell structure | Proportion of open cells [%] | Density [kg/m³] |
|---|---|---|---|
| According to Ex. 4 | 9 | 86 | 8.5 |
| B 1048 | 7 | 88 | 11.1 |
| B 8589 | 8 | 85 | 9.3 |

The lowest foam density and the best cell structure combined with an equally good proportion of open cells are achieved using the foam stabilizer according to the invention, which shows the high activity of the foam stabilizers of the invention.

Example 12

Field of Application of 1-Component Pressure-Pack Foam

The foam formulations indicated in Table 12 below were used for the use-related comparison of foam stabilizers according to the invention and conventional foam stabilizers.

TABLE 12

Formulations for 1-component pressure-pack foam

| Component | Amount used (parts by mass) |
|---|---|
| Polyether polyol* | 24.5 parts |
| Chloroparaffin | 10 parts |
| bis(2,2'-Morpholinoethyl) ether | 0.3 part |
| L-6164** | 0.2 part |
| Stabilizer | 1 part |
| Desmodur 44V20L*** | 44 parts |
| Dimethyl ether | 5 parts |
| Isobutane | 10 parts |
| Propane | 5 parts |

*Glycerol-initiated, propylene oxide alone, 1000 g/mol, OHN 168
**Cell opener from Momentive Performance Materials
***Polymeric MDI from Bayer, 200 mPa * s, 31.5% of NCO, functionality: 2.7

To carry out Example 12, a premix was prepared from the first 4 components in Table 12 and introduced into 6 aerosol cans. A foam stabilizer according to the invention was added to two cans, a conventional SiOC foam stabilizer (comparative example not according to the invention) was added to two further cans and a conventional linear SiC foam stabilizer (comparative example not according to the invention) was added to the last two cans. The amount of isocyanate corresponding to the formulation was added to all 6 cans and the cans were immediately closed by pressing on a valve suitable for PU pressure-pack foam. The cans were charged with blowing agent through the valve and subsequently shaken vigorously by hand. To form the polyurethane prepolymer, the cans were stored at room temperature for 24 hours. One set consisting of three cans with the three different foam stabilizers was then provided with adaptor tubes and foam was discharged by applying foam beads to a slightly moistened piece of paper. After curing, the foam beads were cut open to assess the cell structure. The other 3 cans were stored at 50° C. for 4 weeks and then tested analogously.

All foam stabilizers used and the associated foaming results are shown in Table 13.

TABLE 13

Results for 1-component pressure-pack foam

| Stabilizer | Cell structure | Internal defects/voids | Shrinkage |
|---|---|---|---|
| foamed freshly after preparation ||||
| According to Ex. 5 | very fine, regular | very few | dimensionally stable |
| BF 2270 | very fine, regular | very few | slight shrinkage |
| B 8870 | fine, regular | very few | dimensionally stable |
| foamed after ageing (4 weeks at 50° C.) ||||
| According to Ex. 5 | very fine, regular | very few | dimensionally stable |
| BF 2270 | coarse, irregular | large voids | dimensionally stable |
| B 8870 | fine, regular | very few | dimensionally stable |

It can be seen that 1-component foams of high quality can be obtained using the foam stabilizer of the invention. The comparatively fine cells of the rigid foams produced according to the invention confirm the high activity of the foam stabilizers of the invention, which is also retained after ageing of the cans. On the other hand, in the comparative example which is not according to the invention using an SiOC foam stabilizer according to the prior art, a significant deterioration in the foam quality after ageing is observed, which can possibly be attributed to degradation of the stabilizer.

Example 13

Field of Application of HR Moulded Foam Using MDI

The following foam formulation (figures in each case in parts by mass) was used for the use-related comparison of foam stabilizers according to the invention and conventional foam stabilizers.

100 parts of Desmephen VP.PU 211K01, a polyol from Bayer Material Science, various amounts of siloxane composition, with the composition consisting of a 10% strength by weight solution of the respective siloxane in a butanol-initiated polypropylene glycol having a molar mass of 700, 3 parts of water, 2 parts of triethanolamine, 0.6 part of TEGOAMIN® 33 and 0.2 part of diethanolamine and a mixture of 18.5 parts of polymeric MDI (Desmodur 44V20 from Bayer) and 27.7 parts of TDI (T80=tolylene 2,4- and 2,6-diisocyanate isomer mixture in a mass ratio of 80:20).

The foams were produced in the known way by mixing all components apart from the isocyanate in a cup, subsequently adding the isocyanate and stirring it in quickly at a high stirrer speed. The reaction mixture was then introduced into a cuboidal mould having the dimensions 40×40×10 cm which had been heated to a temperature of 40° C. and the composition was allowed to cure for 10 minutes. The forces for compression were subsequently measured. Here, the foams were compressed 10 times to 50% of their height. The 1st measured value (AD 1 in newton) is a measure of the proportion of open cells in the foam. The foam was subsequently completely compressed (manually) in order to be able to determine the hardness of pressed-open foam at the 11th measured value (AD 11 in newton). The foams were then cut open in order to assess skin and outer zone and determine the cell count (CC). Examples 13a to 13c are summarized in Table 14. The assessments, added amounts of siloxane composition in parts per hundred parts of polyol (pphp) and the siloxane used in each case are shown.

TABLE 14

Results for HR moulded foam using MDI (Example 13)

| | Example | | |
|---|---|---|---|
| | 13a | 13b | 13c |
| AD 1 | 1361 | 1296 | 1370 |
| AD 11 | 126 | 132 | 126 |
| CC | 9.5 | 10 | 10 |
| Skin | good | good | Good |
| Outer zone | good | small number of defects | Good |
| Siloxane | According to Ex. 6 | According to Ex. 7 | B 8726 LF2 |
| Amount added/pphp | 0.3 | 0.5 | 0.5 |

The results show that the siloxanes according to the invention as per Examples 6 and 7 are suitable for stabilizing HR moulded foams for automobile seats when using MDI as isocyanate. The results obtained in respect of proportion of open cells, outer zone stabilization and cell fineness are equally good as when using a conventional siloxane in Comparative Example 13c.

Example 14

Field of Application of HR Moulded Foam Using TDI

The following foam formulation (figures in each case in parts by mass) was used for the use-related comparison of foam stabilizers according to the invention and conventional foam stabilizers.

73 parts of Hyperlite 1629, a polyol from Bayer Material Science, 27 parts of Hyperlite 1650, a polymer polyol from Bayer Material Science, various amounts of siloxane composition, with the composition consisting of a 10% strength by weight solution of the respective siloxane in a butanol-initiated polypropylene glycol having a molar mass of 700, 4 parts of water, 0.9 part of diethanolamine, 0.4 part of TEGOAMIN® 33, 0.06 part of TEGOAMIN® BDE, 0.6 part of glycerol and 46 parts of isocyanate (T80=tolylene 2,4- and 2,6-diisocyanate isomer mixture in a mass ratio of 80:20).

The foams were produced in the known way by mixing all components apart from the isocyanate in a cup, subsequently adding the isocyanate and stirring it in quickly at a high stirrer speed. The reaction mixture was then introduced into a cuboidal mould having the dimensions 40×40×10 cm which had been heated to a temperature of 65° C. and the composition was allowed to cure for 6 minutes. The ability of the foam to be pressed open (AD) was subsequently assessed on a scale of 1-10, where 1 represents a foam having a very high proportion of open cells and 10 represents a foam having a very high proportion of closed cells. The foams were then cut open in order to assess the quality (skin and outer zone) and determine the cell count (CC). Examples 14a to 14c are summarized in Table 15. The assessments, the siloxane used in each case and added amounts of siloxane composition in pphp are shown.

TABLE 15

Results for HR moulded foam using TDI (Example 14)

| Example | 14a | 14b | 14c |
|---|---|---|---|
| AD 1 | 1954 | 1825 | 1990 |
| AD 11 | 158 | 155 | 160 |
| CC | 11 | 11 | 11 |
| Skin | good | good | good |
| Outer zone | good | good | good |
| Siloxane | According to Ex. 6 | According to Ex. 7 | B 8724 LF2 |
| Amount added/pphp | 1.0 | 0.5 | 0.8 |

The results show that the siloxanes according to the invention as per Examples 6 and 7 in higher concentrations are likewise suitable for use as stabilizers in HR moulded foams for automobile seats using TDI as isocyanate. The results obtained in respect of proportion of open cells, outer zone stabilization and cell count are equally good as when using a conventional siloxane as used in Comparative Example 14c.

Example 15

Field of Application of Flexible Slabstock Foam

A flexible polyurethane foam was produced in a 27 cm×27 cm open wooden box having a wall height of 27 cm by foaming a polyurethane formulation having the following constituents for the use-related comparison of foam stabilizers according to the invention and conventional foam stabilizers (figures in each case in parts by mass):

| | |
|---|---|
| 100 parts | of a trifunctional polypropylene glycol having an OH number of 48 |
| 5.0 parts | of water |
| 0.15 part | of amine catalyst* |
| 0.23 part | of tin catalyst** |
| 5.0 parts | of a physical blowing agent (dichloromethane) |
| 64.2 parts | of isocyanate (tolylene diisocyanate T80) (80% of 2,4 isomer, 20% of 2,6 isomer) |
| Variable | foam stabilizer |

*TEGOAMIN ® 33, which is obtainable from Evonik Goldschmidt GmbH and is a 33% strength solution of triethylenediamine in dipropylene glycol
**KOSMOS ® 29, which is obtainable from Evonik Goldschmidt GmbH and is the tinII salt of ethylhexanoic acid.

The foam stabilizer according to the invention as per Example 8 was used here. A conventional SiOC foam stabilizer served as reference (comparative example not according to the invention).

The foams produced were assessed in terms of the following physical properties:

Settling of the foam after the end of the rise phase (=settling).

Foam density (FD)

The air permeability of the foam was determined by means of a pressure buildup measurement on the foam. The pressure buildup measured was reported in mm of water, and the lower pressure buildup values then characterize a more open foam. Values were measured in the range from 0 to 300 mm.

The results shown in Table 16 were obtained.

TABLE 16

Results for Example 15 (flexible slabstock foam)

| Stabilizer | Parts of stabilizer | Settling [cm] | Foam density [kg/m³] | Porosity [mm of water] |
|---|---|---|---|---|
| According to Ex. 8 | 0.8 | −1.3 | 18.4 | 11 |
| | 0.6 | −1.7 | 18.7 | 9 |
| TEGOSTAB BF 2270 | 0.8 | −1.0 | 18.3 | 34 |
| | 0.6 | −1.8 | 18.6 | 15 |

The results demonstrate that flexible polyurethane foams can be produced using the preparations according to the invention. It can be seen that the stabilizer according to the invention displays a wide processing latitude. While in the case of the reference stabilizer an increase in the amount of stabilizer results in an increase in the pressure buildup, the porosity of the stabilizer according to the invention remains constant within normal fluctuations.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A composition comprising compounds of formula (I)

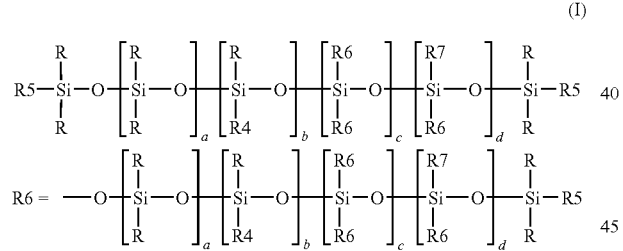

where
the indices a are each, independently of one another, from 0 to 500,
the indices b are each, independently of one another, from 0 to 60,
the indices c are each, independently of one another, from 0 to 10,
the indices d are each, independently of one another, from 0 to 10,
with the proviso that $\Sigma c + \Sigma d$ is greater than or equal to 1 per molecule of formula (I) and that the average number $\Sigma d$ of T units and the average number $\Sigma c$ of Q units per molecule are in each case not greater than 50, the average number $\Sigma a$ of D units per molecule is not greater than 2000 and the average number $\Sigma b$ of siloxy units bearing R4 per molecule is not greater than 100,
the radicals R are at least one radical from the group consisting of linear, cyclic or branched, aliphatic or aromatic, saturated or unsaturated hydrocarbon radicals having from 1 to 20 carbon atoms,
the radicals R5 are each, independently of one another, R4, —OR8 or R, the radicals R4 are each, independently of one another, —OR8 or an organic radical which is not R,
the radicals R7 can each be R, R4, —OR8 and/or a heteroatom-substituted, functional, organic, saturated or unsaturated radical selected from the group consisting of alkyl, chloroalkyl, chloroaryl, fluoroalkyl, cyanoalkyl, acryloxyaryl, acryloxyalkyl, methacryloxyalkyl, methacryloxypropyl and vinyl radicals, the radicals R8 are each, independently of one another, hydrogen or an alkyl radical having from 1 to 10 carbon atoms,
with the proviso that at least one substituent from among R4, R5 and R7 is not R and at least one compound of formula (I) in which at least one of the radicals R4, R5 and R7 is a radical —OR8 is present and, averaged over all compounds of the formula (I) present in the composition, not more than 20 mol % of the radicals R4, R5 and R7 are —OR8.

2. The composition according to claim 1, wherein, averaged over all compounds of formula (I) present in the composition, from 0.1 to 10 mol % of the radicals R4, R5 and R7 are of the type —OR8.

3. The composition according to claim 1, further comprising additives selected from SiOC and SiC stabilizers, organic foam stabilizers, surfactants, nucleating agents, cell-refining additives, cell openers, crosslinkers, emulsifiers, flame retardants, antioxidants, antistatics, biocides, colour pastes, solid fillers, amine catalysts, metal catalysts, polyols, buffer substances and mixtures thereof.

4. The composition according to claim 1, further comprising a solvent selected from glycols, alkoxylates and oils of synthetic and/or natural origin.

5. The composition according to claim 1, wherein the radicals R4 are selected independently from
—OR8
—CH$_2$—CH$_2$—CH$_2$—O—(CH$_2$—CH$_2$O—)$_x$(CH$_2$—CH(R')O—)$_y$—R"
—CH$_2$—CH$_2$—O—(CH$_2$—CH$_2$O)$_x$(CH$_2$—CH(R')O—)$_y$—R"
—CH$_2$—R$^{IV}$
—CH$_2$—CH$_2$(O)$_{x'}$—R$^{IV}$
—CH$_2$—CH$_2$—CH$_2$—O—CH$_2$—CH(OH)—CH$_2$OH

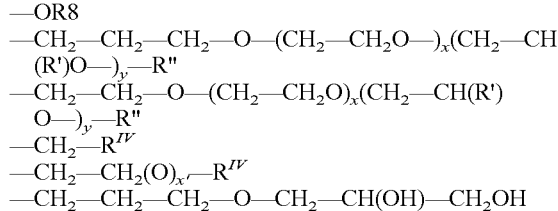

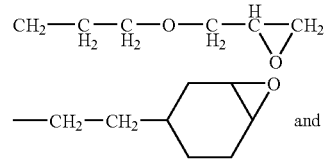 and

—CH$_2$—CH$_2$—CH$_2$—O—CH$_2$—C(CH$_2$OH)$_2$—CH$_2$—CH$_3$, where
x is from 0 to 100,
x' is 0 or 1,
y is 0 to 100,
the radicals R' are each, independently of one another, an optionally substituted alkyl or aryl group having from 1 to 12 carbon atoms, where different substituents R' can be present within a radical R4 and/or a molecule of formula I, and
the radicals R" are each, independently of one another, a hydrogen radical or an alkyl group having from 1 to 4 carbon atoms, a group —C(O)—R''' where R'''=alkyl radical, a group —CH$_2$—O—R', an alkylaryl group, the group —C(O)NH—R', $R^{IV}$ is a linear, cyclic or branched, optionally substituted hydrocarbon radical having from 1 to 50 carbon atoms.

6. A process for producing polyurethane foam, comprising: providing a formulation including one or more organic isocyanates having two or more isocyanate functional groups, one or more polyols having two or more groups that are reactive towards isocyanate, a catalyst and water; adding to said formulation a composition comprising compounds of formula (I)

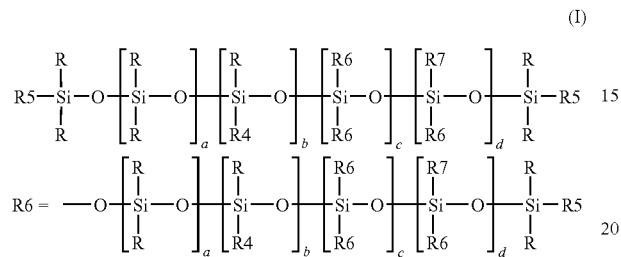

where the indices a are each, independently of one another, from 0 to 500, the indices b are each, independently of one another, from 0 to 60, the indices c are each, independently of one another, from 0 to 10, the indices d are each, independently of one another, from 0 to 10, with the proviso that $\Sigma c + \Sigma d$ is greater than or equal to 1 per molecule of formula (I) and that the average number $\Sigma d$ of T units and the average number $\Sigma c$ of Q units per molecule are in each case not greater than 50, the average number $\Sigma a$ of D units per molecule is not greater than 2000 and the average number $\Sigma b$ of siloxy units bearing R4 per molecule is not greater than 100, the radicals R are each at least one radical from the group consisting of linear, cyclic or branched, aliphatic or aromatic, saturated or unsaturated hydrocarbon radicals having from 1 to 20 carbon atoms, the radicals R5 are each, independently of one another, R4, —OR8 or R, the radicals R4 are each, independently of one another, —OR8 or an organic radical which is not R, the radicals R7 can each be R, R4, —OR8 and/or a heteroatom-substituted, functional, organic, saturated or unsaturated radical selected from the group consisting of alkyl, chloroalkyl, chloroaryl, fluoroalkyl, cyanoalkyl, acryloxyaryl, acryloxyalkyl, methacryloxyalkyl, methacryloxypropyl and vinyl radicals, the radicals R8 are each, independently of one another, hydrogen or an alkyl radical having from 1 to 10 carbon atoms, with the proviso that at least one substituent from among R4, R5 and R7 is not R and at least one compound of formula (I) in which at least one of the radicals R4, R5 and R7 is a radical —OR8 is present and, averaged over all compounds of the formula (I) present in the composition, not more than 20 mol % of the radicals R4, R5 and R7 are —OR8; and producing a polyurethane foam from said admixture.

7. The process according to claim 6, wherein the composition is added in such an amount that the proportion by mass of compounds of formula (I) in the polyurethane foam is from 0.01 to 10% by weight.

8. The process according to claim 6, wherein the formulation further includes at least one blowing agent selected from methylene chloride, pentane, alkanes, halogenated alkanes, acetone and carbon dioxide.

9. A polyurethane foam comprising a composition according to claim 1.

10. The polyurethane foam according to claim 9, wherein the proportion by mass of compounds of formula (I) in the polyurethane foam is from 0.01 to 10% by weight.

11. The polyurethane foam according to claim 9, wherein the polyurethane foam is a rigid polyurethane foam.

12. The polyurethane foam according to claim 9, wherein the polyurethane foam is a flexible polyurethane foam.

13. The polyurethane foam according to claim 9, wherein the polyurethane foam is a viscoelastic foam.

14. The polyurethane foam according to claim 9, wherein the polyurethane foam is a high resilience (HR) foam.

15. The polyurethane foam according to claim 9, wherein the polyurethane foam is a semirigid polyurethane foam.

16. The polyurethane foam according to claim 9, wherein the polyurethane foam is a thermoformable polyurethane foam.

17. The polyurethane foam according to claim 9, wherein the polyurethane foam is an integral foam.

* * * * *